United States Patent Office 3,788,881
Patented Jan. 29, 1974

3,788,881
INK RECEIVING MATTE SHEET MATERIALS OVERCOATED WITH ALKYLATED VINYL-PYRROLIDONE POLYMERS
Jacques C. T. Tellier, Conklin, N.Y., assignor to GAF Corporation, New York, N.Y.
No Drawing. Filed Nov. 3, 1971, Ser. No. 195,469
Int. Cl. B32b 27/36
U.S. Cl. 117—73                               11 Claims

ABSTRACT OF THE DISCLOSURE

Ink-receiving matte sheet materials, comprising a polyester base support precoated with a cellulosic film-forming polymer and thereafter overcoated with a composition comprising an alkylated vinylpyrrolidone polymer.

This invention relates to ink receiving matte sheet materials generally and more particularly to a treating composition which when applied to matte surfaces markedly improves the ink receptivity and ink adhesive properties thereof.

Plastic surfaces present a poor or totally unsuitable surface for imaging with ink. Inks are generally unable to wet plastic surfaces. Thus, a discontinuous film or ink line is produced. In addition, an ink image on plastic surfaces will readily rub, peel or flake off. Poor ink adhesion on plastic surfaces is a problem in many fields and is particularly trouble-some in the drafting field where plastic films, plastic-coated drafting cloths, etc., are commonly imaged with India ink or the like.

Plastic materials require a pre-coating, generally a lacquer, in order to accept ink directly to the surface. The most commonly used plastic base support material which requires such a precoat is a polyester. A specific polyester which finds widespread use is a heat-set and biaxially-oriented linear polyester such as terephthalic acid ethylene glycol polyester, sold under the trademarks "Mylar"; "Melinex" or "Celanar."

The lacquer precoat which has usually been employed heretofore is a cellulosic film-forming polymer such as nitrocellulose, ethyl cellulose, cellulose acetate, celuose acetate propionate, cellulose acetate butyrate, or other cellulose esters or ethers or the like, dissolved in suitable solvents such as, methylethyl ketone, ethyl acetate, methyl isobutyl ketone, toluene, etc. Included in the lacquer coating may be a plastcizer such as an alkyd resin or phthalate ester. In addition, a hardener such as urea-formaldeyhde resin may also be added. This lacquer coating may vary in thickness from 0.2 to 1.0 mil depending on the end use of the plastic media.

In order to provide a matte finish, suitable for marking with ink, the lacquer coating may include a finely divided pigment such as finely powdered glass having a particle size ranging from 2–6 microns, amorphous or diatomaceous silica. Titanium dioxide may also be added to impart a white background color.

A serious failing of such heretofore known lacquered surfaces is that they still exhibit insufficient ink receptivity. As already indicated, poor ink receptivity is common to plastic materials generally. The ink indicia tends to feather so that it is difficult to draw sharp, well-defined lines. The ink tends to accumulate in excess amounts at the beginning of the writing or drawing at stoppage points or slow down in writing such that small globules of ink form at these points. This is particularly undesirable in engineering documents. In addition, the ink image is not firmly affixed to the plastic surface. This can be readily demonstrated by an adhesion test in which a piece of pressure-sensitive tape is placed across an ink-imaged area. Rapid, as well as slow peeling of the tape from the imaged area, will remove most of the ink image. In addition to be being readily removed with pressure-sensitive tape, the ink will flake off when the plastic member is creased across the ink image. Ink images in the past have not lent themselves to correction with a type of erasing knife which chipped off uncontrolled portions of the image rather than deleted only specific portions. Thus, ragged, bordering edges result. It is an object of this invention to provide a treating composition and/or an overcoated article which will not be subject to one or more of the above disadvantages.

It is a further object of this invention to provide an improved matte sheet material capable of accepting ink indicia.

It is another object of this invention to provide an improved method and materials for treating a plastic surface to render it ink-receptive so that an ink image thereon will be readily and firmly affixed thereto. Other objects and advantages will appear as the description proceeds.

The attainment of the above objects is made possible by this invention which comprises the provision of improved matte sheet materials capable of receiving ink markings comprising a polyester film base at least one surface of which carries a first layer of cellulosic matte film-forming lacquer composition, the surface of said first layer carrying a second layer comprising an alkylated vinyl pyrrolidone polymer.

The above matte lacquer composition may include as the film-forming material a cellulosic compound such as cellulose acetate, cellulose nitrate, cellulose acetate butyrate, cellulose acetate propionate, either alone or in admixture with polyvinylidene chloride, polyvinyl chloride, polyvinyl acetate, polyurethane, polystyrene, polymethyl methacrylate, polyethyl methacrylate, polymethyl acrylate, polyethyl acrylate, the copolymer of acrylonitrile-butadienestyrene, phenol-formaldehyde, urea formaldehyde, polyisocyanates, polyester and polycarbonate.

The plastic base support material and/or the precoat thereon may be transparent, translucent or opaque and may be coated on one or both sides with the treating composition.

According to this invention, the aforementioned matte surfaces are rendered highly ink receptive by treating the matte surface with a treating composition comprising a polymer of alkylated vinylpyrrolidone. The resulting overcoated matte surface has greatly improved ink-receptive properties and the ink image is well-defined and adheres firmly to the surface. An ink image on the overcoated matte surface is not readily removed with pressure-sensitive tape nor does it exhibit the aforementioned poor ink-receptive properties.

In achieving the objects of this invention, a treating composition comprising a polymer of alkylated vinylpyrrolidone dissolved or dispersed in a liquid medium is applied to a plastic pre-lacquered matte surface.

The lacquer precoats described in the discussion of the prior art, if desired containing finely divided pigment and/ or titanium dioxide, when treated in accordance with this invention exhibit improved ink-receptive properties.

The alkylated vinylpyrrolidone polymers utilized in the present invention and their methods of preparation are fully disclosed in U.S. Pats. 3,417,054 and 3,423,381.

The alkylated vinylpyrrolidone polymers are soluble in aliphatic and aromatic hydrocarbons such as, n-hexane, n-heptane, benzene, toluene, kerosene, mineral oils, and in petroleum ether, ethyl ether, ketones, alcohols or in mixtures of the above solvents.

The alkylated vinylpyrrolidone polymers of the present invention may be prepared by the process of treating one mole of polyvinylpyrrolidone with 0.05 to 10 moles of an α-olefin of at least 2 carbon atoms in solution of an organic solvent common to the polymer and α-olefin in the presence of 0.025 to 0.30 mole of an organic peroxide catalyst per mole of α-olefin at a temperature ranging from 100° C. to 200° C. for a period of time ranging from 3 to 60 hours.

The alkylated vinyl pyrrolidone polymers of the present invention may also be prepared by the process of simultaneously copolymerizing and alkylating vinylpyrrolidone with an α-olefin. Vinylpyrrolidone is readily copolymerized and alkylated with an α-olefin by treating one mole of the vinylpyrrolidone with 0.05 to 10 moles of an α-olefin of at least 2 carbon atoms in solution of an organic solvent common to the vinylpyrrolidone and α-olefin in the presence of 0.025 to 0.30 mole of an organic peroxide catalyst per mole of α-olefin at a temperature ranging from 80° to 200° C. for a period of time ranging from 3 to 60 hours.

The concentration of the alkylated vinylpyrrolidone polymer in the treating composition is not critical and may vary from about 1% to about 20% by weight, depending on coating equipment and conditions.

The treating composition can be applied to the surface of the matte by any known coating method such as, for example, air knife, reverse roll bead or wire wound rod. It can also be applied merely by spraying, swabbing the surface with a cloth saturated with the treating composition etc. The amount of treating composition applied to the plastic surface is not a critical factor. Preferably, the amount should be in the range of 0.5–10.0 grams per square meter, however, the range can be as broad as 0.3 to 15.0 grams per square meter. After application of the treating composition, drying can be accomplished by ambient evaporation, forced air or heated ovens.

The following examples describe in detail the method and materials that comprise the present invention and are intended to be illustrative of said invention and not limiting thereof. All parts and proportions referred to herein and in the appended claims are by weight unless otherwise indicated.

This invention is not limited to improving the ink receptivity of the film-forming surfaces mentioned in the following examples but will improve the ink-receptive properties of the numerous film-forming surfaces already indicated.

EXAMPLE 1

A treating composition is prepared by mixing 1 part by weight of an alkylated vinylpyrrolidone polymer consisting of 50% by weight of a vinylpyrrolidone component, and 50% by weight of a $C_{16-20}$ alkylating component into 99 parts by weight of toluene. The polymer is prepared by the process of simultaneously copolymerizing and alkylating vinylpyrrolidone with a mixture of commercially available linear α-olefins in the carbon range of from $C_{16}$ to $C_{20}$ as disclosed in U.S. Pat. 3,423,381.

This treating composition is applied to a cellulose acetate propionate-lacquer precoated polyester base by roller coating in conjunction with an air knife, and dried to obtain a thin uniform coating having the desired improved ink-receptive matte surface.

The above 50:50 alkylated vinylpyrrolidone polymer can be substituted by one prepared by the alkylation of a homopolymer of the vinylpyrrolidone with a mixture of commercially available linear α-olefins in the carbon range of from $C_{16}$ to $C_{20}$, as disclosed in U.S. Pat. 3,417,054.

EXAMPLE 2

The procedure of Example 1 is repeated, except the treating composition is instead prepared by mixing 5 parts by weight of the same alkylated vinylpyrrolidone polymer into 95 parts by weight toluene. Similar results are obtained.

EXAMPLE 3

The procedure of Example 1 is repeated except the treating composition is instead prepared by mixing 20 parts by weight of the same alkylated vinylpyrrolidone polymer described in Example 1, into 80 parts by weight toluene. Similar results are obtained.

EXAMPLES 4, 5 AND 6

Examples 1, 2 and 3 are repeated respectively using an alkylated vinylpyrrolidone polymer consisting of 20% by weight of the vinylpyrrolidone component and 80% by weight of the alkylating component in place of the alkylated vinylpyrrolidone polymer described in Examples 1, 2 and 3.

EXAMPLES 7, 8 AND 9

Examples 1, 2 and 3 are repeated respectively using an alkylated vinylpyrrolidone polymer consisting of 30% by weight of the vinylpyrrolidone component and 70% by weight of the alkylating component in place of the the alkylated vinylpyrrolidone polymer described in Examples 1, 2 and 3. Similar results are obtained.

EXAMPLES 10, 11 AND 12

Examples 1, 2 and 3 are repeated respectively using an alkylated vinylpyrrolidone polymer consisting of 80% by weight of the vinylpyrrolidone component and 20% by weight of the alkylating component in place of the alkylated vinylpyrrolidone polymer described in Examples 1, 2 and 3. Similar results are obtained.

EXAMPLES 13, 14 AND 15

Examples 1, 2 and 3 are repeated using an alkylated vinylpyrrolidone polymer consisting of 90% by weight of the vinylpyrrolidone component and 10% by weight of the alkylating component in place of the alkylated vinylpyrrolidone polymer described in Examples 1, 2 and 3.

Ink images are applied to each of the overcoated matte-surfaced products of Examples 1 through 15. The ink images on each of these treated surfaces adhered firmly thereto. A piece of pressure-sensitive tape was placed across the ink-imaged area on each of these treated surfaces. Rapid as well as slow peeling of the tape from the imaged area did not readily remove the imaged ink.

This invention has been disclosed with respect to certain preferred embodiments and it will be understood that modifications and variations thereof will become obvious to persons skilled in the art and are intended to be included within the spirit and purview of this application and the scope of the appended claims.

I claim:

1. Improved matte sheet material capable of receiving ink markings comprising a polyester film base at least one surface of which carries a first layer of cellulosic matte film-forming lacquer composition, the surface of said first layer carrying a second layer consisting essentially of an alkylated vinyl pyrrolidone polymer.

2. The matte sheet material of claim 1 wherein the second layer is derived from a solution of said alkylated vinyl pyrrolidone polymer and a solvent therefor.

3. The matte sheet material of claim 2 wherein the said solution contains from about 1% to about 20% of said polymer.

4. The matte sheet material of claim 2 wherein the said solution is applied to the cellulosic matte lacquer coated film base in the range of about 0.3 to about 15.0 grams per square meter.

5. The matte sheet material of claim 1 wherein the alkylated vinylpyrrolidone polymer consists of 50% by weight of the vinylpyrrolidone component and 50% by weight of the alkylating component.

6. The matte sheet material of claim 5 wherein the alkylating component arises from alkylation with a mixture of linear α-olefins in the carbon range of $C_{16}$ to $C_{20}$.

7. The matte sheet material of claim 1 wherein the alkylated vinylpyrrolidone polymer consists of 20% by weight of the vinylpyrrolidone component and 80% by weight of the alkylating component.

8. The matte sheet material of claim 1 wherein the alkylated vinylpyrrolidone polymer consists of 30% by weight of the vinylpyrrolidone component and 70% by weight of the alkylating component.

9. The matte sheet material of claim 1 wherein the alkylated vinylpyrrolidone polymer consists of 80% by weight of the vinylpyrrolidone component and 20% by weight of the alkylating component.

10. The matte sheet material of claim 1 wherein the alkylated vinylpyrrolidone polymer consists of 90% by weight of the vinylpyrrolidone component and 10% by weight of the alkylating component.

11. The matte sheet material of claim 1 wherein the alkylating component contains 16 to 20 carbon atoms.

References Cited
UNITED STATES PATENTS

| | | | |
|---|---|---|---|
| 3,489,597 | 1/1970 | Parker | 117—73 |
| 3,417,054 | 12/1968 | Merijan et al. | 260—66 |
| 3,423,381 | 1/1969 | Merijan et al. | 260—88.1 R |

RALPH HUSACK, Primary Examiner

U.S. Cl. X.R.

117—15, 76 F, 138.8 F; 260—66, 88.1 R